US012628107B2

(12) United States Patent
     Sirotkin et al.

(10) Patent No.:  US 12,628,107 B2
(45) Date of Patent:    May 12, 2026

(54) NETWORK IDENTIFICATION COLLISION DETECTION FOR PRIVATE NETWORKS

(71) Applicant: Apple Inc., Cupertino, CA (US)

(72) Inventors: Alexander Sirotkin, Tel Aviv (IL); Daniel M. Valins, San Francisco, CA (US); Nai Tao Cui, Santa Clara, CA (US); Raj S. Chaugule, Santa Clara, CA (US); Sudeep Manithara Vamanan, Nuremberg (DE); Tao Tao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 18/403,411

(22) Filed: Jan. 3, 2024

(65) Prior Publication Data

US 2024/0267867 A1     Aug. 8, 2024

Related U.S. Application Data

(60) Provisional application No. 63/443,107, filed on Feb. 3, 2023.

(51) Int. Cl.
     *H04W 60/00*     (2009.01)
     *H04W 76/10*     (2018.01)
(52) U.S. Cl.
     CPC ......... *H04W 60/00* (2013.01); *H04W 60/001* (2025.08); *H04W 76/10* (2018.02)
(58) Field of Classification Search
     CPC .... H04W 60/00; H04W 60/001; H04W 76/10
     See application file for complete search history.

(56) References Cited

U.S. PATENT DOCUMENTS

| | | | | |
|---|---|---|---|---|
| 2017/0347220 A1* | 11/2017 | Hole | ...................... | H04W 8/22 |
| 2018/0070327 A1* | 3/2018 | Qureshi | ............ | H04W 56/0055 |
| 2018/0077728 A1* | 3/2018 | Shi | ........................ | H04W 76/10 |
| 2019/0182898 A1* | 6/2019 | Yu | ...................... | H04B 7/06958 |
| 2021/0345342 A1* | 11/2021 | Sakhnini | .............. | H04W 72/23 |
| 2022/0070652 A1* | 3/2022 | Grayson | .............. | H04W 12/06 |
| 2023/0021642 A1* | 1/2023 | Grayson | ................ | H04W 8/26 |

* cited by examiner

*Primary Examiner* — Raymond S Dean
(74) *Attorney, Agent, or Firm* — Kilpatrick Townsend & Stockton LLP

(57)                ABSTRACT

Techniques are directed toward network identification collision detection. An example method includes selecting a first subscriber identity module (SIM) associated with a public land mobile network identifier (PLMN ID) and a network identifier (NID) of a private network. The method can further include generating a first non-access stratum (NAS) registration request to establish a connection with the private network using the first SIM. The method can further include processing a NAS registration request reject message received from the private network. The method can further include selecting a second SIM associated with the PLMN ID and the NID. The method can further include generating a second NAS registration request to establish a connection with the private network using the second SIM. The method can further include processing a NAS registration request success message received from the private network. The method can further include logging NID collision information.

20 Claims, 11 Drawing Sheets

```
UEInformationRequest-r16-IEs ::= SEQUENCE {
    idleModeMeasurementReq-r16    ENUMERATED{true}    OPTIONAL, -- Need N
    logMeasReportReq-r16          ENUMERATED {true}   OPTIONAL, -- Need N
    connEstFailReportReq-r16      ENUMERATED {true}   OPTIONAL, -- Need N
    ra-ReportReq-r16              ENUMERATED {true}   OPTIONAL, -- Need N
    rlf-ReportReq-r16             ENUMERATED {true}   OPTIONAL, -- Need N
    mobilityHistoryReportReq-r16  ENUMERATED {true}   OPTIONAL, -- Need N
    lateNonCriticalExtension      OCTET STRING OPTIONAL,
    nonCriticalExtension          UEInformationRequest-v1700-IEs OPTIONAL
}

UEInformationRequest-v1700-IEs ::= SEQUENCE {
    successHO-ReportReq-r17       ENUMERATED {true}   OPTIONAL, -- Need N
    ccarseLocationRequest-r17     ENUMERATED {true}   OPTIONAL, -- Need N
    nonCriticalExtension          UEInformationRequest-vxyz-IEs OPTIONAL
}

UEInformationRequest-vxyz-IEs ::= SEQUENCE {
    rdCollisionReportReq-rxyz     ENUMERATED {true}   OPTIONAL, -- Need N
    nonCriticalExtension          SEQUENCE {}         OPTIONAL
}
```

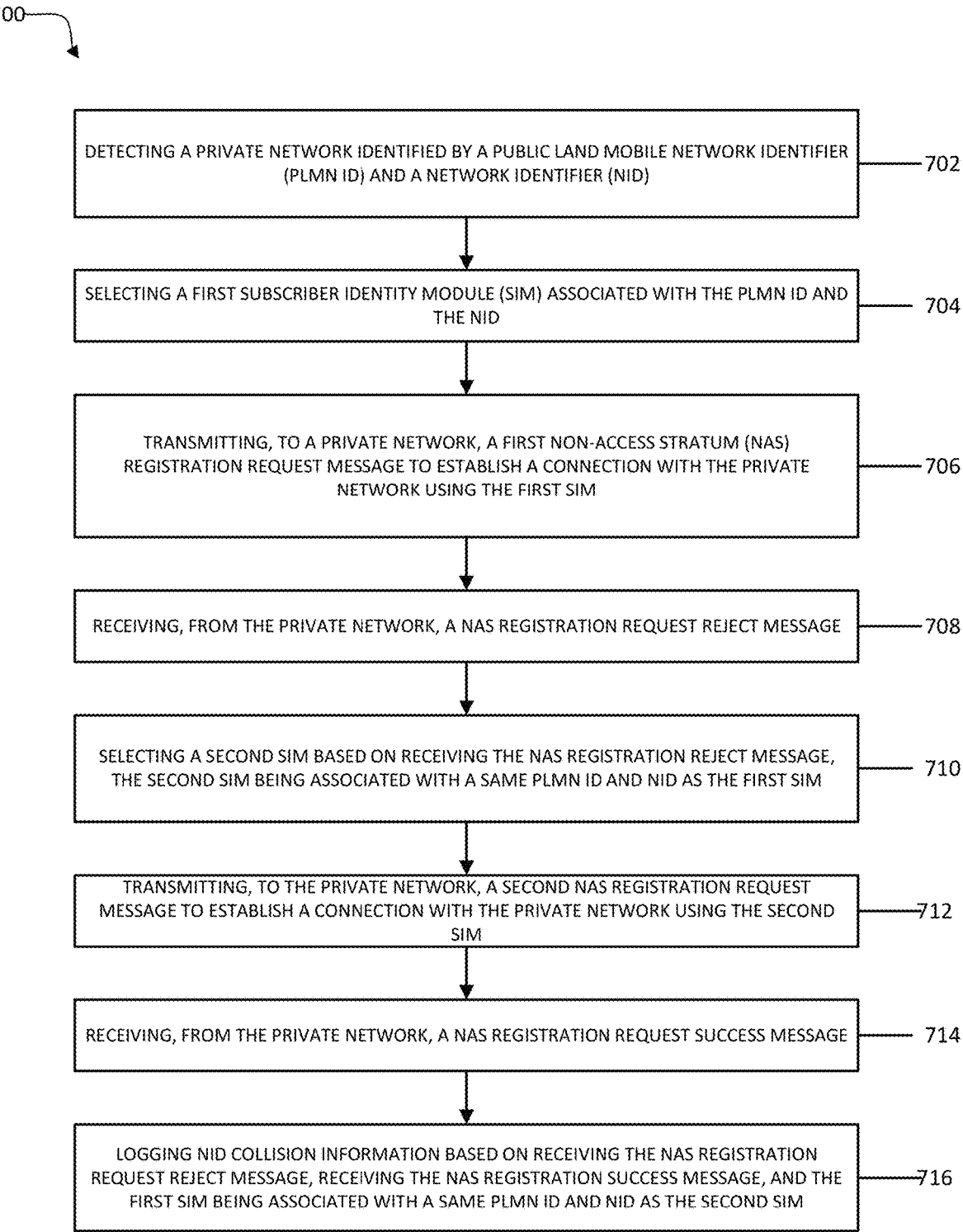

700

DETECTING A PRIVATE NETWORK IDENTIFIED BY A PUBLIC LAND MOBILE NETWORK IDENTIFIER (PLMN ID) AND A NETWORK IDENTIFIER (NID) — 702

SELECTING A FIRST SUBSCRIBER IDENTITY MODULE (SIM) ASSOCIATED WITH THE PLMN ID AND THE NID — 704

TRANSMITTING, TO A PRIVATE NETWORK, A FIRST NON-ACCESS STRATUM (NAS) REGISTRATION REQUEST MESSAGE TO ESTABLISH A CONNECTION WITH THE PRIVATE NETWORK USING THE FIRST SIM — 706

RECEIVING, FROM THE PRIVATE NETWORK, A NAS REGISTRATION REQUEST REJECT MESSAGE — 708

SELECTING A SECOND SIM BASED ON RECEIVING THE NAS REGISTRATION REJECT MESSAGE, THE SECOND SIM BEING ASSOCIATED WITH A SAME PLMN ID AND NID AS THE FIRST SIM — 710

TRANSMITTING, TO THE PRIVATE NETWORK, A SECOND NAS REGISTRATION REQUEST MESSAGE TO ESTABLISH A CONNECTION WITH THE PRIVATE NETWORK USING THE SECOND SIM — 712

RECEIVING, FROM THE PRIVATE NETWORK, A NAS REGISTRATION REQUEST SUCCESS MESSAGE — 714

LOGGING NID COLLISION INFORMATION BASED ON RECEIVING THE NAS REGISTRATION REQUEST REJECT MESSAGE, RECEIVING THE NAS REGISTRATION SUCCESS MESSAGE, AND THE FIRST SIM BEING ASSOCIATED WITH A SAME PLMN ID AND NID AS THE SECOND SIM — 716

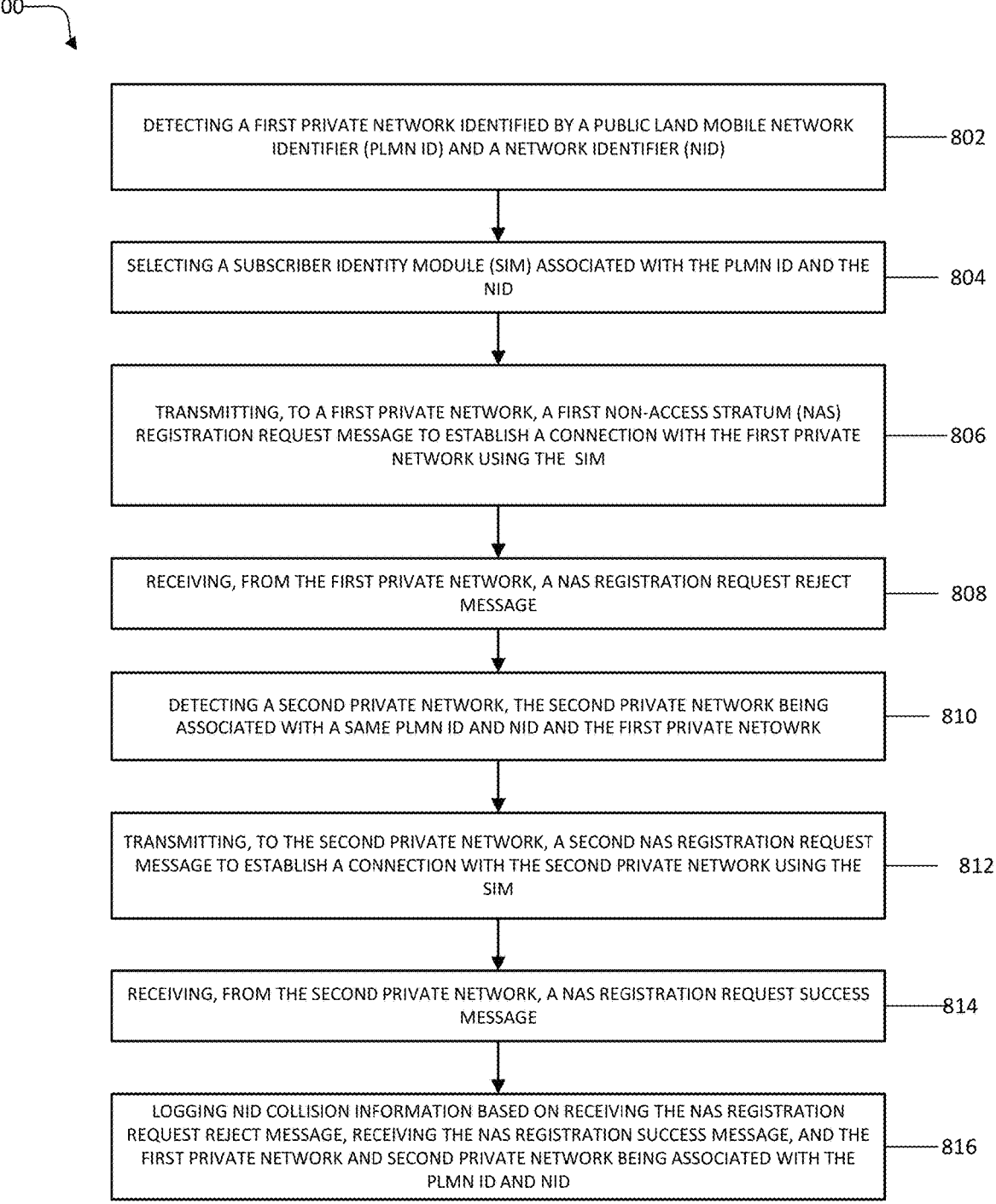

DETECTING A FIRST PRIVATE NETWORK IDENTIFIED BY A PUBLIC LAND MOBILE NETWORK IDENTIFIER (PLMN ID) AND A NETWORK IDENTIFIER (NID) —— 802

SELECTING A SUBSCRIBER IDENTITY MODULE (SIM) ASSOCIATED WITH THE PLMN ID AND THE NID —— 804

TRANSMITTING, TO A FIRST PRIVATE NETWORK, A FIRST NON-ACCESS STRATUM (NAS) REGISTRATION REQUEST MESSAGE TO ESTABLISH A CONNECTION WITH THE FIRST PRIVATE NETWORK USING THE SIM —— 806

RECEIVING, FROM THE FIRST PRIVATE NETWORK, A NAS REGISTRATION REQUEST REJECT MESSAGE —— 808

DETECTING A SECOND PRIVATE NETWORK, THE SECOND PRIVATE NETWORK BEING ASSOCIATED WITH A SAME PLMN ID AND NID AND THE FIRST PRIVATE NETOWRK —— 810

TRANSMITTING, TO THE SECOND PRIVATE NETWORK, A SECOND NAS REGISTRATION REQUEST MESSAGE TO ESTABLISH A CONNECTION WITH THE SECOND PRIVATE NETWORK USING THE SIM —— 812

RECEIVING, FROM THE SECOND PRIVATE NETWORK, A NAS REGISTRATION REQUEST SUCCESS MESSAGE —— 814

LOGGING NID COLLISION INFORMATION BASED ON RECEIVING THE NAS REGISTRATION REQUEST REJECT MESSAGE, RECEIVING THE NAS REGISTRATION SUCCESS MESSAGE, AND THE FIRST PRIVATE NETWORK AND SECOND PRIVATE NETWORK BEING ASSOCIATED WITH THE PLMN ID AND NID —— 816

FIG. 8

NETWORK IDENTIFICATION COLLISION DETECTION FOR PRIVATE NETWORKS

CROSS-REFERENCES TO RELATED APPLICATIONS

This application claims the benefit of U.S. Provisional Application No. 63/443,107, filed on Feb. 3, 2023, which is incorporated by reference herein in its entirety for all purposes.

BACKGROUND

Cellular communications can be defined in various standards to enable communications between a user equipment and a cellular network. For example, long-term evolution (LTE) and Fifth generation (5G) networks are defined by wireless standards that aim to improve upon data transmission speed, reliability, availability, and more.

BRIEF DESCRIPTION OF THE DRAWINGS

FIG. 5 is an illustration of example ASN.1 language for requesting NID collision information, according to one or more embodiments.

FIG. 7 is a process flow for detecting an NID collision by a multi-SIM device, according to one or more embodiments.

FIG. 8 is a process flow for detecting an NID collision by a single-private SIM device, according to one or more embodiments.

DETAILED DESCRIPTION

Figure 1:
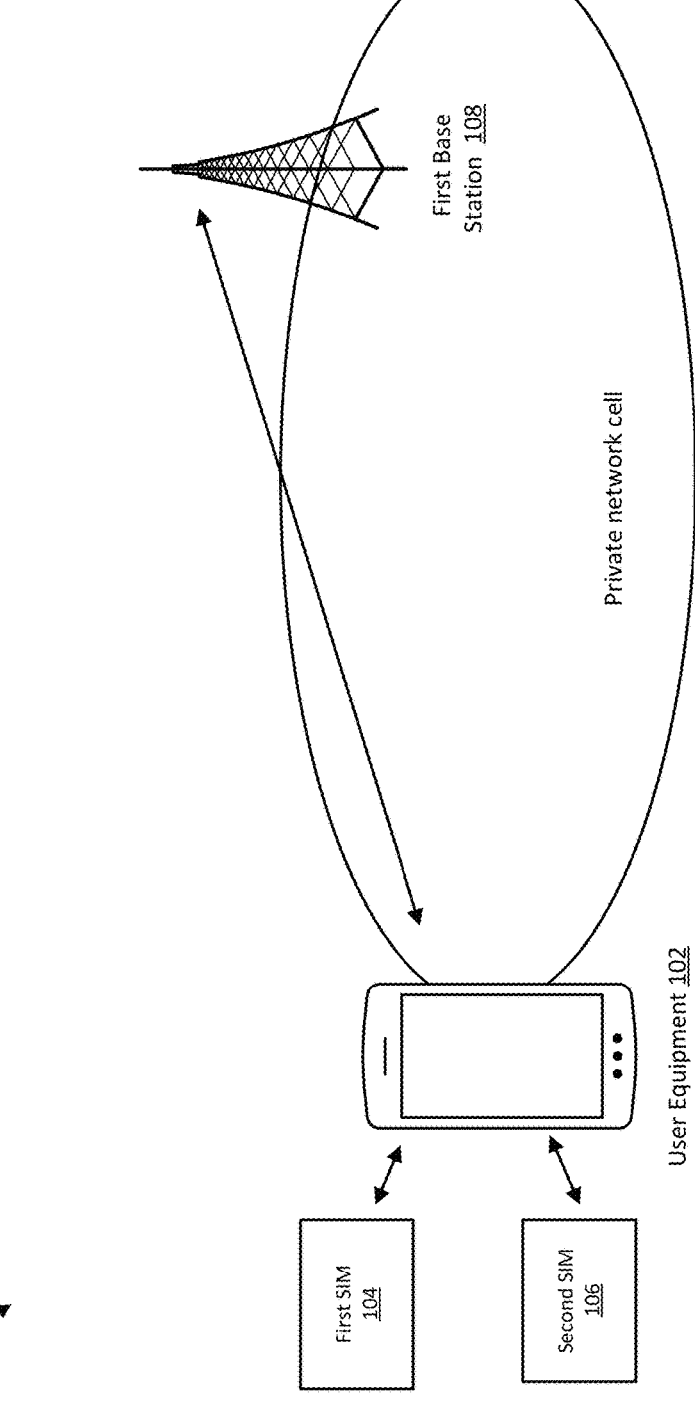
FIG. 1 is an illustration of a system for connecting to a private network, according to one or more embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network component of a communications network (or, more briefly, a network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "network" as used herein reference to a communications network that includes a set of network nodes configured to provide communications functions to a plurality of user equipment via one or more base stations. For instance, the network can be a public land mobile network (PLMN) that implements one or more communication technologies including, for instance, 5G communications.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The term "3GPP Access" refers to accesses (e.g., radio access technologies) that are specified by 3GPP standards. These accesses include, but are not limited to, GSM/GPRS, LTE, LTE-A, 5G NR, and/or 6G. In general, 3GPP access refers to various types of cellular access technologies.

The term "Non-3GPP Access" refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted." Trusted non-3GPP accesses can interact directly with an evolved packet core (EPC) and/or a 5G core (5GC), whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

A private network, such as a stand-alone non-public network (SNPN), can offer non-public cellular connectivity using licensed, licensed, or shared spectrum (e.g., a Citizen's Broadband Radio Service (CBRS) network). In a private network, as in a public network, a user equipment (UE) can detect an error and notify the network of an error. The procedure by which the UE reports the error can be based on a framework in which the UE is operating. In a self-organizing network (SON), when the UE encounters an error, it can log the error. For example, if supported by UE capability, if the UE encounters a radio link failure (RLF), the UE can store relevant information in an internal variable report (e.g., a VarRLF-Report). If the UE has logged SON information, the UE can indicate the information's availability by including the UE-measurements available information element (IE) in a radio resource control (RRC) establishment complete message, an RRC reconfiguration complete message, an RRC resume complete message, or an RRC setup complete message. The UE can receive a request to provide the logged information via a UE information request. The UE can provide the requested SON information using a UE information response message.

If the UE is configured for a minimization of driving test (MDT) mechanism, the UE can behave similarly to a UE in a SON configuration, such that when the UE encounters an error, it can log the error. The UE can transmit an indication of the availability of the MDT measurements information. The UE can receive a request for the MDT measurement information using a UE information request, UE information response or a message. In contrast to SON, however, MDT measurements are configured using a separate procedure (e.g., a logged measurement configuration). Additionally, MDT measurements can be performed in both an RRC idle state or an RRC connected state, and typically over a longer period of time than a SON configuration.

One form of private network can be a CBRS network, which is a network architecture defined by WINNF-TS-0016 V1.2.7 (21 Mar. 2022) and operable to provide service over a defined spectrum. In one example, the CBRS includes a spectrum from 150 MHz in the 3550 MHz to 3700 MHz range shared by three tiers of users. The first tier includes incumbent access users, who are grandfathered users, such as fixed satellite services. The second tier includes priority access licensees (PAL), who are users that have acquired a portion of the frequency band through a competitive bidding process. The third tier includes general authorized access (GAA) users, who are users that can use frequencies not previously assigned to one of the higher tier users (e.g., incumbent and PAL). As described herein, tiers are not limited to CBRS tiers, as multiple cellular networks across the globe have implemented tiered systems, such as a licensed shared access model. Rather the above is illustrative of a tiered system in which higher tier-level users have greater access to network users than lower-tier users.

CBRS operators and the On Go alliance have adopted 3GPP (and other air interface) specifications. For long term evolution (LTE) and evolved packet core (EPC), the CBRS alliance introduced the neutral host (NH) base station and the mobility management entity (MME).

Embodiments of the present disclosure are described in connection with 5G networks. However, the embodiments are not limited as such and similarly apply to other types of communication networks including other types of cellular networks. For 5G/New Radio(NR), private networks feature s provide intrinsic neutral host support. A network can include a spectrum access system (SAS) to access the CBRS spectrum. The CBRS can access the SAS using a CBRS device (CBRSD), such as a base station.

FIG. 1 is an illustration of a system for connecting to a private network, according to one or more embodiments. A user equipment (UE) 102, can connect to a private network using a registration procedure for gaining access to the network. For example, the UE 102 can include a first subscriber identity module (SIM) 104 and a second SIM 106, that each include a list of networks that the UE 102 to which the UE 102 can be connected. The UE 102 can select a network and transmit non-access stratum (NAS) registration request to a private network (e.g., via a base station 108). In response to the NAS registration request, the private network can respond with a Registration Accept message if the request is successful, or the private network can respond with a Registration Reject message in the request is unsuccessful In some instances, rather than a physical SIM, the UE 102 can include one or more embedded SIMs (eSIMs). An eSIM can be a digital version of a physical SIM card that enables the UE 102 to connect to an operator without using the physical SIM. The UE 102 can include multiple eSIMs that can enable the UE 102 to toggle between eSIMs to connect to different networks. Some private networks are eSIM compatible and therefore, a single UE 102 that includes multiple eSIMs can connect to different private networks without using a physical SIM.

One issue that can arise for the UE 102 is selecting the correct SIM in instances that the UE 102 includes multiple SIMs that share a common PLMN ID and NID. In general, networks can be identified using a public land mobile network identifier (PLMN ID). A private network, can be identified by a network identifier (NID) in addition to the PLMN ID. The NID for each private network can be self-assigned or assigned in a centralized manner. This can be due to large networks having the infrastructure and resources to obtain a PLMN ID relatively easily, however, obtaining a PLMN ID may be difficult for a smaller entity. It should be appreciated that one type of PLMN is a shared home network identifier (SHNI). The SHNI can be an HNI designation by the Alliance for Telecommunication Industry Solutions Identity Oversight Council (ATIS IOC) for CBRS operations. The HNI can be a combination of a mobile country code (MCC) and mobile network code (MNC) (e.g., MCC+MNC). For example, the SHNI of a CBRS network can be 315-010. The private networks are, however, expected to use different NIDs. In practice, private network operators often fail to assign unique NIDs, and the result is that multiple private networks have the same PLMN ID and NID. As a result, the UE 102 can attempt to connect to a private network using the wrong SIM due to having multiple SIMS that include the same PLMN ID and NID. This can cause an NID collision that is problematic for private networks with overlapping coverage or private networks that do not have overlapping coverage but are in proximity to one another. In either case, the inability to distinguish SIMs based on duplicated PLMN IDs and NIDs can lead to multiple unnecessary registration attempts.

Embodiments described herein address the above-referenced issues by providing techniques for error detection and reporting of NID collisions. In one embodiment, the techniques can include extending the SON framework to include a new indication in a UE message to indicate that an NID collision has been detected by the UE 102. Once the network has been notified of the NID collision, the network can mitigate the situation. For example, the network can configure a new NID, or the network can consider using a centrally-assigned NID.

Figure 2:
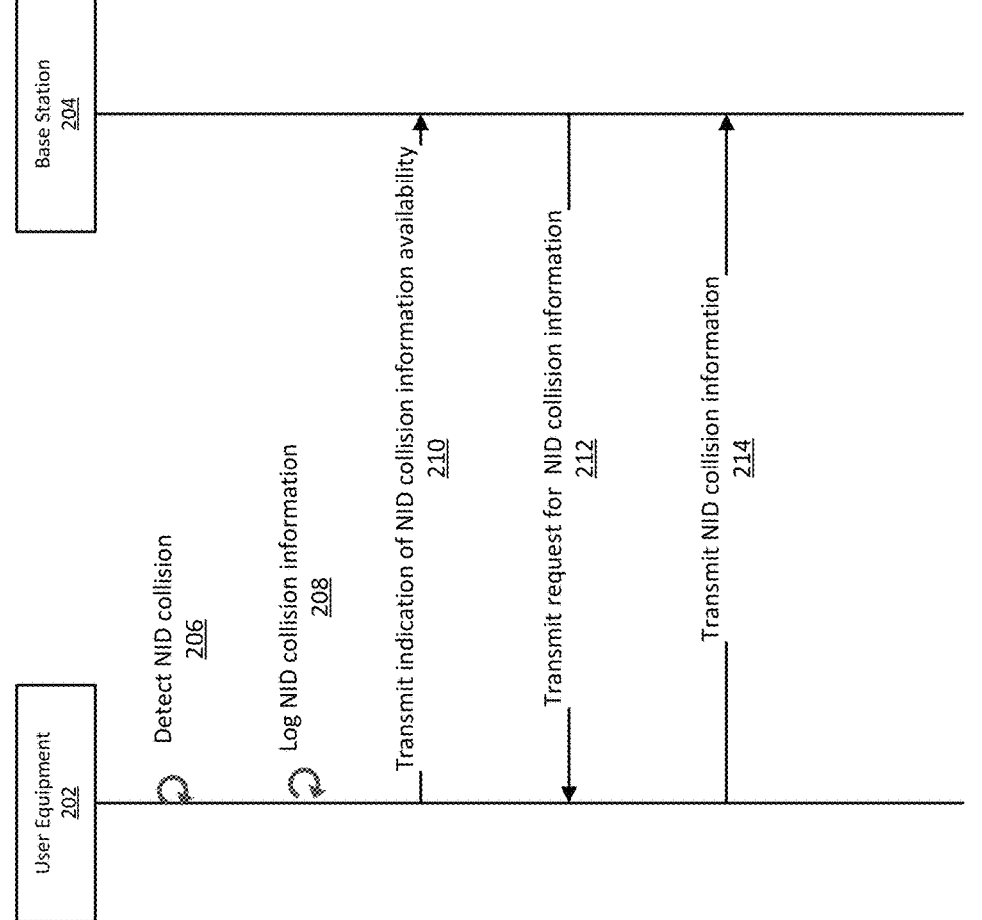
FIG. 2 is a signaling diagram for network identifier (NID) collision detection and notification, according to one or more embodiments.

FIG. 2 is a signaling diagram for NID collision detection and notification, according to one or more embodiments. As illustrated, a UE 202 can be in operable communication with a base station 204. For example, the UE 202 can use the base station 204 to connect with a private network. The UE 202 can include multiple SIMs, in which the first SIM can include a PLMN ID and an NID that is the same as the PLMN ID and NID of a second SIM. At 206, the UE 202 can detect an NID collision, and based on the NID collision detection, the UE 202 can log NID collision information. The NID collision information can include an indication that the NID collision has occurred. If supported by the UE 202 and consented to by a user and/or based on user preference, the NID collision information can further include global navigation satellite system (GNSS) information, including the UE's location. The NID collision information can also include, if supported by the UE 202 and consented to by a user and/or based on user preference coarse information, such as a cell identifier, and a number of highest bits of the GNSS location. The NID collision information can further include a time when the NID collision occurred. The NID collision information can further include the PLMN ID, NID, and human readable network name of the second private network (e.g., the human readable network name can sent to the UE using system information block 10 (SIB10)).

At 210, the UE 202 can transmit an indication of NID collision information availability to the base station 204. The UE can include the indicator (e.g., nidCollisionInfoAvailable) in various messages, such as an RRC reestablishment complete message, and RRC reconfiguration, complete message, an RRC resume complete message, and an RRC setup complete message.

At 212, the base station 204 can transmit a request for the NID collision information. The base station 204 can transmit a request that includes an indicator (e.g., nidCollisioninfoReq) in a UE information request RRC message.

At 214, the UE 202 can transmit the logged NID collision information to the base station 204. The UE 202 can transmit the logged NID information in a UE information response RRC message. The UE 202 can then discard the logged NID collision information.

In some instances, the UE 202 can transmit the UE 202 can transmit an indication of NID collision information availability to the base station 204 as in step 210. However, the base station 204 does not transmit a request for the NID collision information as in step 212. Therefore, in some embodiments, the UE 202 can discard the logged NID collision information after one or more expiration criteria are met. The UE 202 can be configured with the expiration criteria by the base station 204. For example, the base station 204 can transmit configuration instructions using an RRC message. In other instances, the UE 202 can be hard coded with the expiration criteria, by, for example, a UE manufacturer. One expiration criteria can be a time-based expiration criteria, where the UE 202 discards the expiration criteria upon expiration of a time interval. Another expiration criteria can be a location-based expiration criteria. For example, the location-based expiration criteria can cause the UE 202 to discard the logged NID collision information based on the UE's location. The UE's location can be based on the UE's present coordinates being a threshold distance away from the UE's coordinates when the NID collision occurred. The location-based expiration criteria can further include exceeding a threshold number of cell re-selections/handovers. The location-based expiration criteria can further include the UE 202 performing a re-selection or handover procedure to a cell with a different tracking area code (TAC) than the cell in which the NID collision occurred. Yet another location-based expiration criteria can be that the UE 202 leaves the coverage of the private network in which the NID collision occurred.

In some other embodiments, the UE 202 can maintain the logged NID collision information if the UE 202 connects to a different network (e.g., a public network) than the private network with which the NID collision occurred. In these embodiments, the UE 202 does not report the NID collision information availability to the different network. In the instance that the UE 202 re-establishes a connection with the private network with which the NID collision occurred, the UE 202 can then report the NID collision information availability to the private network. The UE 202 can further provide the NID collision information upon request.

In some instances, the UE 202 can detect multiple NID collisions. Therefore, in some embodiments, the UE 202 can discard previously logged NID collision information and log new NID collision information when a new NID collision occurs. Alternatively, the UE 202 can optionally, based on a UE configuration, discard the previously logged NID collision information, and log the new NID collision information when a new NID collision occurs. In yet other embodiments, the UE 202 can support logging and reporting multiple NID collisions. In these embodiments, the UE 202 can be limited to logging a defined maximum number of NID collisions. In the event that the UE 202 reaches the maximum number of logged NID collisions, the UE 202 can either discard the oldest logged NID collision information and log new NID collision information, or discontinue logging new NID collision information.

Figure 3:
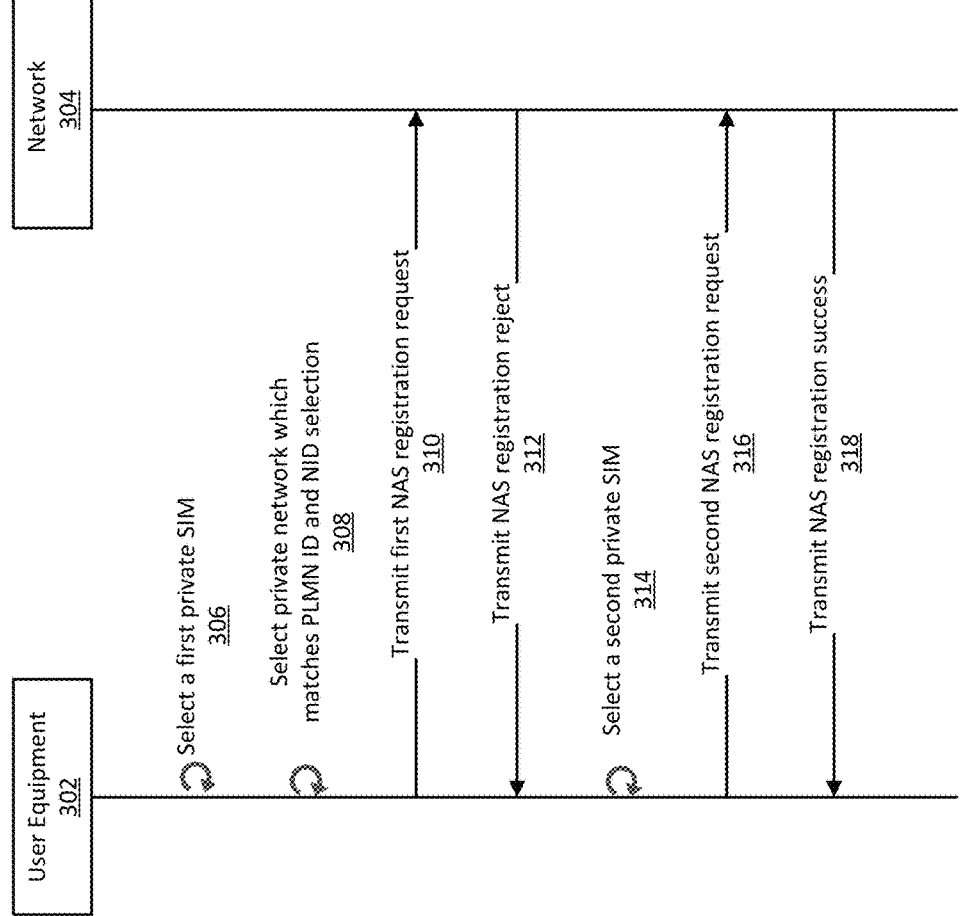
FIG. 3 is a signaling diagram for detecting an NID collision, according to one or more embodiments.

FIG. 3 is a signaling diagram 300 for detecting an NID collision, according to one or more embodiments. As illustrated a UE 303 can be in operable communication with a network 304 (e.g., private network). The UE 302 can include multiple SIMs (e.g., physical SIM cards and/or eSIMs) for connecting to different networks. In some instances, the UE 302 can attempt an initial registration procedure with a network and the registration is successful after one attempt. In these instances, the UE 302 can consider that no NID collision has occurred. In other instances, the initial registration attempt with a network can be unsuccessful, but successful in a subsequent attempt, and in these instances, the UE 302 can consider that an NID collision has occurred. An example signaling diagram 300 for these instances in which an NID collision occurs is as follows.

At 306, the UE 302 can select a SIM to connect with the network 304. For example, the UE 302 can enter into the coverage area of the network 394 and initiate a procedure to register with the network 304. At 308, the UE 302 can select the network for registration based on the network matching PLMN ID and NID selection criteria. In some instances, the UE may include multiple private SIMs that match the PLMN ID and NID selection criteria. In these instances, the UE 302 can select, for example, the most recently used private SIM, or use some other private SIM selection criteria.

At 310, the UE 302 can transmit a NAS registration request to the network 304 to establish a connection with the network.

At 312, the authentication can fail, and the network 304 can transmit a NAS registration reject message back to the UE 302. The authentication can fail, for example, based on the UE 302 selecting a first private SIM associated with a same PLMN ID and NID as the network 304, but the network 304 determining that the selected first private SIM is not associated with the network 304.

At 314, the UE 302 can select a second private SIM to establish a connection with the network 304. The second private SIM can be associated with the same PLMN ID and NID as the first private SIM selected at step 306. The second private SIM, however, can be associated with the network 304.

At 316, the UE 302 can transmit a second NAS registration request to the network 304 using the second private SIM. The network 304 can determine that the second private SIM is associated with the network 304.

At 318, the network 304 can transmit a NAS registration success message to the UE 302. Based on (1) the initial NAS registration reject message from the network 304, (2) a subsequent NAS registration success message from the network 304, where the first private SIM and the second private SIM are associated with the same PLMN ID and NID, the UE 302 can determine that an NID collision has occurred. The UE 302 can further log the NID collision information.

A situation similar to that situation described by FIG. 3 can occur when a UE (e.g., UE 302) attempts to connect with a private network while transitioning from an RRC IDLE state to an RRC CONNECTED state. The UE can perform an RRC connection establishment procedure (e.g., see 3GPP Technical Specification (TS) 38.300, clause 9.2.1.3, V17.3.0 (2022-12)). The UE can transmit a NAS registration request to the private network using a first private SIM associated with a PLMN ID and NID of the private network. However, the access stratum (AS) security activation with the private network can fail based on the UE selecting the incorrect private SIM, and the private network can transmit a NAS registration request reject message to the UE. The UE can then select a second private SIM that is associated with the same PLMN ID and NID as the first private SIM. The private network can determine that the second private SIM is associated with the private network. Therefore, based on the second private SIM, the UE can successfully establish a connection with the private network. Based on both SIMs being associated with the same PLMN ID and NID, the initial connection request rejection, and the subsequent connection success, the UE can determine that an NID collision occurred. The UE can further log the NID collision information.

Another similar situation is when the UE attempts to connect with a private network while transitioning from an RRC INACTIVE state to an RRC CONNECTED state. The UE can transmit a request (e.g., an RRCResumeRequest message) for a connection with the private network using a first private SIM associated with a PLMN ID and NID of the private network. The private network can reply with an RRC reject message to the request based on the first private SIM not being associated with the private network. In this instance, UE cannot detect the cause for the rejection. The UE can then select a second private SIM that is associated with the same PLMN ID and NID as the first private SIM. The private network can determine that the second private SIM is associated with the private network. Based on the second private SIM, the UE can successfully connect with the private network. Based on both SIMs being associated with the same PLMN ID and NID, the initial connection request rejection, and the subsequent connection success, the UE can determine that an NID collision occurred. The UE can further log the NID collision information.

In some instances, the UE can include a single SIM, or the UE can include a single private SIM (e.g., the UE can include the single private SIM and a non-private SIM). In these instances, the UE can sometimes be located in an overlapping coverage area of two private networks that have the same PLMN ID and NID. The UE can detect a first private network based on an SIB1 broadcast from the first private network. The private network can be associated with the same PLMN ID and NID as the UE's SIM. The UE can attempt to connect to the first private network by transmitting a NAS registration request message to the first private network using the SIM. The registration request can fail, and the UE can receive a NAS registration fail message from the first private network. The registration can fail, for example, because the private network is not associated with the UE's SIM. The UE can detect a second private network that uses the same PLMN ID and NID as the first private network (e.g., through another SIB1 broadcast). Furthermore, the UE can determine that expiration criteria, as described above, has not been fulfilled prior to detecting the second private network. The UE can transmit a NAS registration request to the second private network and the registration procedure can succeed based on the UE's SIM being associated with the network. As there has been an unsuccessful registration request to a first private network followed by a successful registration to a second private network, where both private networks share the same PLMN ID and NID, the UE can determine that an NID collision has occurred. The UE can further log the NID collision information.

In some other instances, a single SIM UE can be located in overlapping area of two private networks that has the same PLMN ID and NID. The UE can further attempt to establish a connection with a private network while transitioning from an RRC IDLE state to an RRC CONNECTED state. The UE can transmit a NAS registration request to the private network. However, the access stratum (AS) security activation with the first private network can fail based on the UE's SIM not being associated with the private network. The private network can transmit an RRC reject message to the UE. The UE can detect a second private network that uses the same PLMN ID and NID as the first private network. The UE can transmit a NAS registration request to the second private network and the registration procedure can succeed based on the UE's SIM being associated with the private network. The private network can transmit a NAS registration success message to the UE. As there has been an unsuccessful registration request to a first private network followed by a successful registration to a second private network, where both private networks share the same PLMN ID and NID, The UE can determine that an NID collision has occurred. The UE can further log the NID collision information.

As indicated above, in some instances, a network (e.g., private network) can transmit a NAS registration reject message to a UE. The NAS registration reject message can include a cause code indicating a reason for the rejection. The cause code included in the NAS rejection reject message can be cause code #11 "PLMN not allowed" or cause code #13 "Roaming not allowed in this tracking area." The UE can, in addition to storing the tracking area identity (TAI) of the tracking area where the NAS registration reject message was received, the NR cell global identifier (NCGI) of the cell where the NAS registration reject message was received. As indicated above, after receiving a NAS registration reject message, the UE can search for another cell in which to camp. The UE can consider the NCGI from the stored "forbidden tracking areas for roaming" (e.g., see, 3GPP TS 23.122, V18.1.0 (2022-12)) to evaluate the suitability of a candidate cell for camping. Alternatively, the private network can use cause codes other than cause code #11 and cause code #13 for rejecting a NAS registration request when the assignment mode 1 (e.g., self-assigned) is used to assign the NID of the private network.

Figure 4:
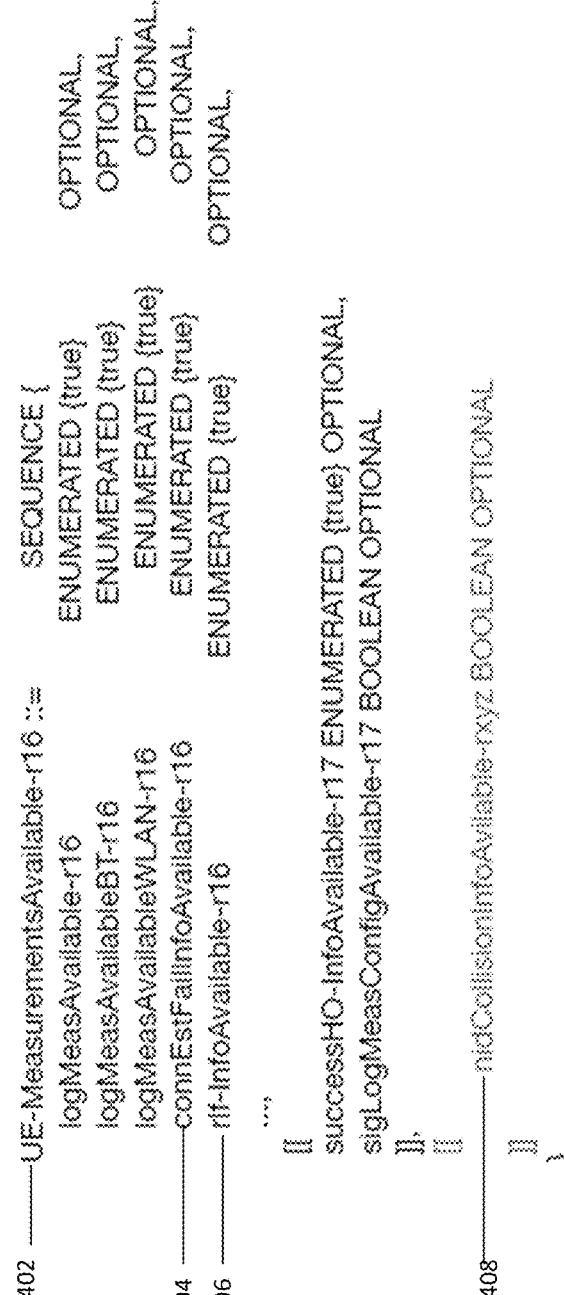
FIG. 4 is an illustration of example abstract syntax notation one (ASN.1) language for indicating the availability of NID collision information, according to one or more embodiments.
Figure 6:
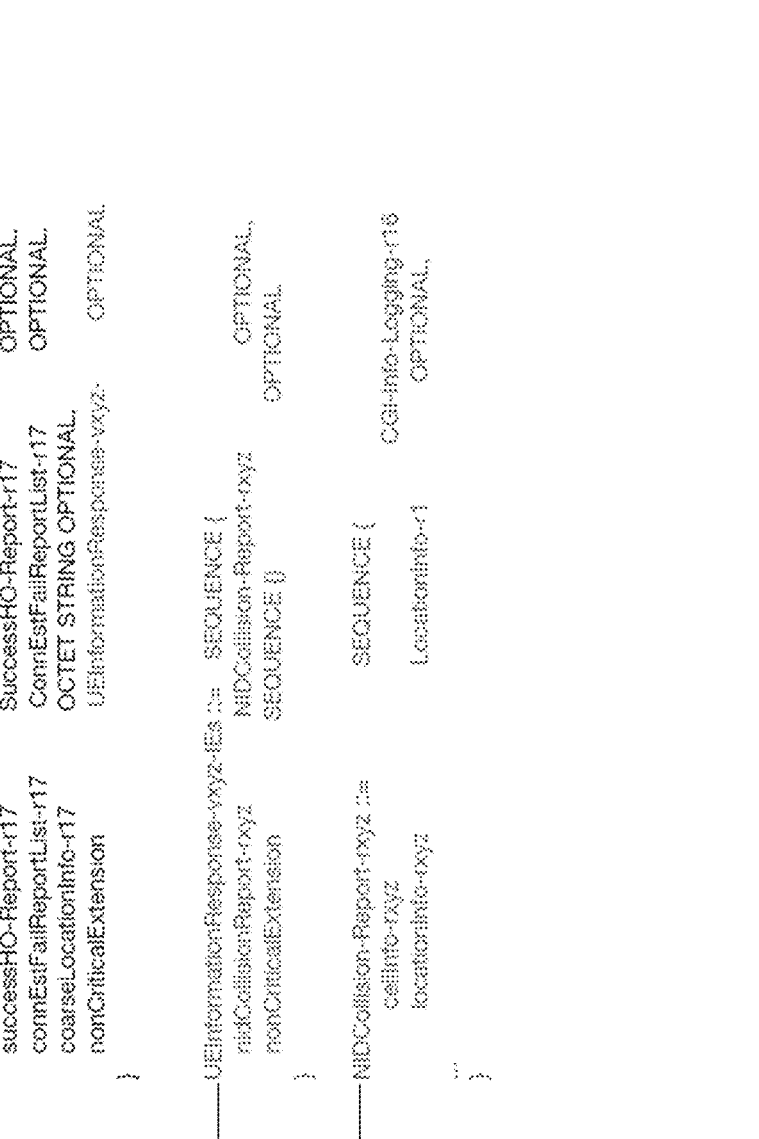
FIG. 6 is an illustration of example ASN.1 language for reporting an NID collision, according to one or more embodiments.

FIGS. 4-6 include example abstract syntax notation one (ASN.1) language that can be used to implement one or more of the steps described above. FIG. 4 is an illustration 400 of example ASN.1 language for indicating the availability of NID collision information, according to one or more embodiments. As illustrated, the ASN.1 includes messaging from a UE to a base station for indicating the availability of NID collision information. The ASN.1 language includes a first information element (IE) 402 that UE measurements are available. The ASN.1 language further includes a second IE 404 that connection establishment failure information is available. A third IE 406 suggests that RLF information is available. The first three IE's can be as described in 3GPP TS 38.331.V17.3.0 (2022-12). A fourth IE 408 suggests that NID collision information is available.

FIG. 5 is an illustration 500 of example ASN.1 language for requesting NID collision information, according to one or more embodiments. As seen, the ASN.1 language includes a first IE 502 for a base station requesting NID collision information from a UE.

FIG. 6 is an illustration of example ASN.1 language for reporting an NID collision, according to one or more embodiments. As illustrated, the ASN.1 language includes a first IE 602 indicating contents of a response to a request for NID collision information from a base station. The ASN.1 language further includes a second IE 604 indicating the contents of a NID collision report.

The embodiments above have described NID detection and reporting to a private network. Alternatively, the UE can report the availability of NID collision information to an application server (e.g., an over-the-top server). The server can transmit a response requesting the NID collision information, and the UE can transmit the NID collision information to the server. The server can be deployed by the UE's manufacturer, or the private network operator, or a private user (e.g., a private enterprise). In some embodiments, the server can be a mobile device management (MDM) server, that can include endpoint management software that works with a family of devices. In these embodiments, the UE can detect the NID collision as described above.

FIG. 7 is a process flow for detecting an NID collision by a multi-SIM device, according to one or more embodiments. At 702, the method can include a UE detecting a private network identified by a PLMN ID and an NID. The UE can include a first SIM and a second SIM, in which each SIM shares a common PLMN ID and NID. Each SIM can, in some embodiments be eSIMs.

At 704, the method can include the UE selecting a first SIM associated with the PLMN ID and the NID. The UE can receive an SIB1 broadcast that identifies the PLMN ID and the NID of the private network. The UE can select the first SIM based on the first SIM being associated with the PLMN ID and NID of the private network. If the UE detects multiple SIMs that share a common PLMN ID and NID, the UE can select the most recently used SIM.

At 706, the method can include the UE transmitting, to the private network, a first non-access stratum (NAS) registration request message to establish a connection with the private network using the first SIM.

At 708, the method can include the UE receiving, from the private network, a NAS registration request reject message.

At 710, the method can include the UE selecting a second SIM based on receiving the NAS registration request reject message, the second SIM being associated with a same PLMN ID and NID as the first SIM.

At 712, the method can include the UE transmitting, to the private network, a second NAS registration request message to establish a connection with the private network using the second SIM.

At 714, the method can include the UE receiving, from the private network, a NAS registration request success message. Based in the receiving the NAS registration request success message, the UE can establish a connection with the private network.

At 716, the method can include the UE logging NID collision information based on receiving the NAS registration request reject message, receiving the NAS registration success message, and the first SIM being associated with the same PLMN ID and NID as the second SIM.

FIG. 8 is a process flow for detecting an NID collision by a single-private SIM device, according to one or more embodiments. At 802, the method can include a UE detecting a first private network identified by a PLMN ID and a NID. The UE can include a single private SIM, in which the SIM shares a common PLMN ID and NID with a first private network and a second private network. The SIM can, in some embodiments, be an eSIM.

At 804, the method can include the UE selecting a SIM associated with the PLMN ID and the NID. The UE can receive an SIB1 broadcast that identifies the PLMN ID and the NID of the first private network. The UE can select the first SIM based on the first SIM being associated with the PLMN ID and NID of the first private network.

At 806, the method can include the UE transmitting, to the first private network, a first non-access stratum (NAS) registration request message to establish a connection with the private network using the SIM.

At 808, the method can include the UE receiving, from the first private network, a NAS registration request reject message.

At 808, the method can include the UE detecting a second private network, the second private network being associated with the same PLMN ID and NID as the first private network.

At 810, the method can include the UE transmitting, to the second private network, a second NAS registration request message to establish a connection with a second private network using the SIM.

At 812, the method can include the UE receiving, from the second private network, a NAS registration request success message.

At 814, the method can include the UE logging NID collision information based on receiving the NAS registration request reject message, receiving the NAS registration success message, and the first private network being associated with a same PLMN ID and NID as the second private network.

Figure 9:
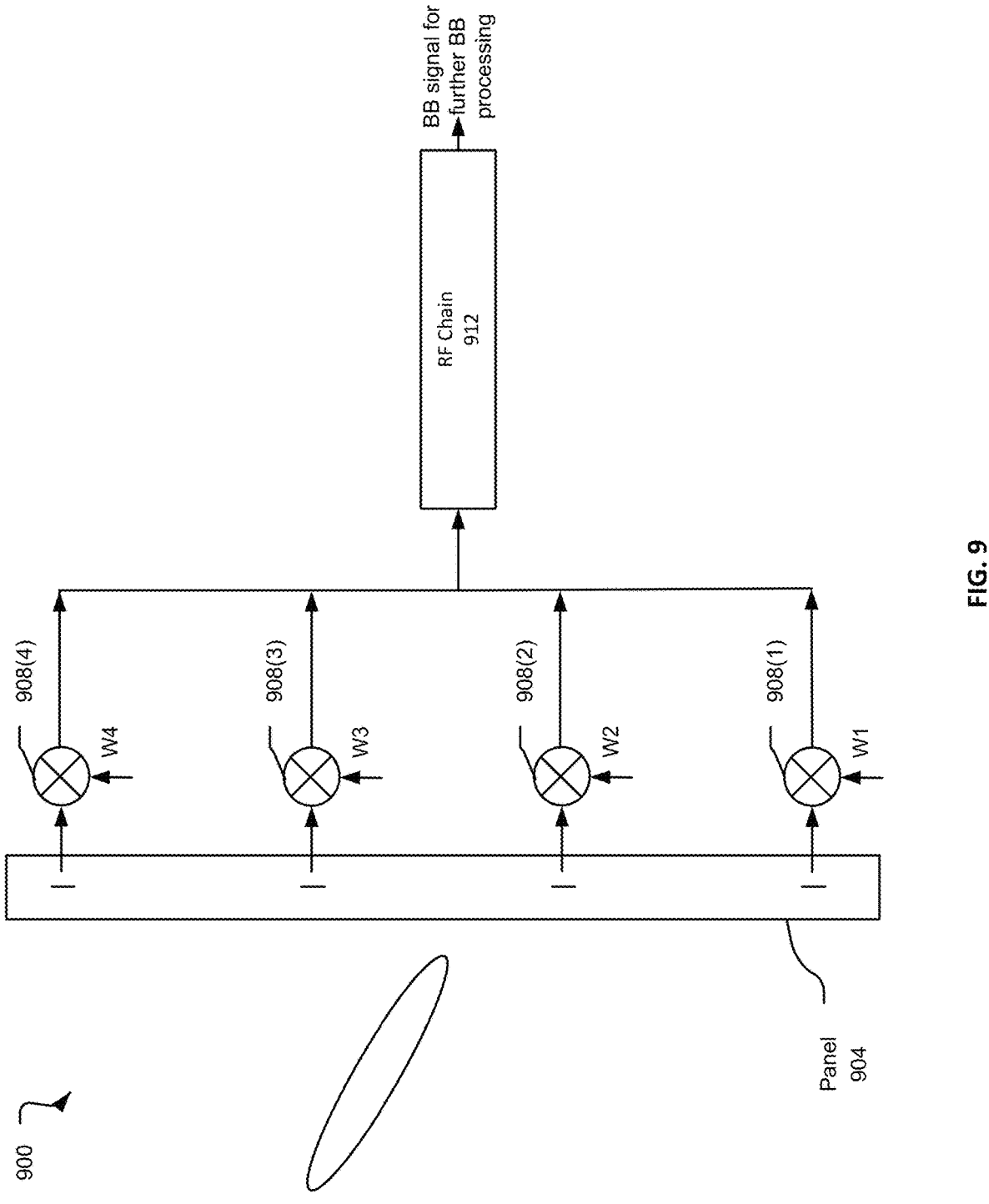
FIG. 9 illustrates an example of receive components, according to one or more embodiments.

FIG. 9 illustrates receive components 900 of a UE, according to one or more embodiments. The receive components 900 may include an antenna panel 904 that includes a number of antenna elements. The panel 904 is shown with four antenna elements, but other embodiments may include other numbers.

The antenna panel 904 may be coupled to analog beam-forming (BF) components that include a number of phase shifters 908(1)-908(4). The phase shifters 908(1)-908(4) may be coupled with a radio-frequency (RF) chain 912. The RF chain 912 may amplify a received analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 908(1)-908(4) to provide a receive beam at the antenna panel 904. These BF weights may be determined based on the channel-based beamforming.

Figure 10:
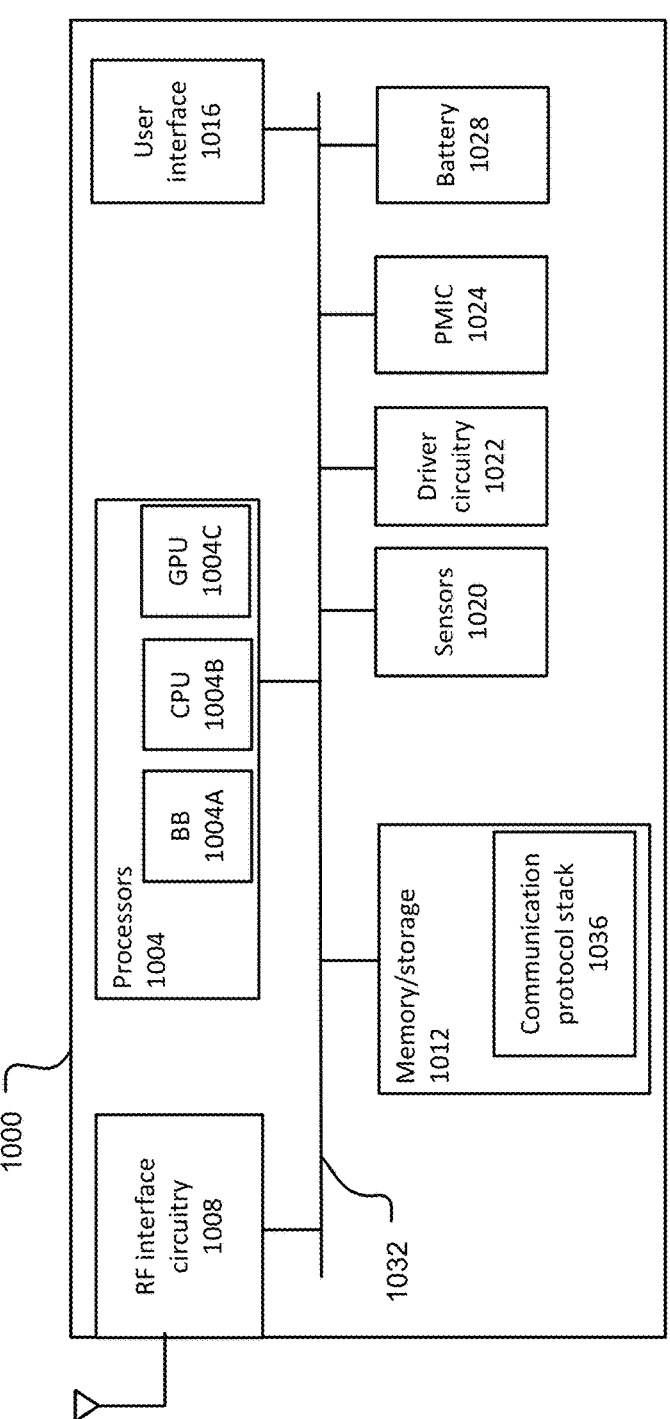
FIG. 10 illustrates an example of a UE, according to one or more embodiments.

FIG. 10 illustrates a UE 1000, according to one or more embodiments. The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1000 may include processors 1004, RF interface circuitry 1008, memory/storage 1012, user interface 1016, sensors 1020, driver circuitry 1022, power management integrated circuit (PMIC) 1024, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangements of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1004A may also access group information 1024 from memory/storage 1012 to determine search space groups in which a number of repetitions of a PDCCH may be transmitted.

The memory/storage 1012 may include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1008 may include transceiver circuitry and a radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1024 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1024.

In various embodiments, the RF interface circuitry 1008 may be configured to transmit/receive signals in a manner compatible with NR access technologies.

The antenna 1024 may include a number of antenna elements that each convert electrical signals into radio waves to travel through the air and to convert received radio waves into electrical signals. The antenna elements may be arranged into one or more antenna panels. The antenna 1024 may have antenna panels that are omnidirectional, directional, or a combination thereof to enable beamforming and multiple input, multiple output communications. The antenna 1024 may include microstrip antennas, printed antennas fabricated on the surface of one or more printed circuit boards, patch antennas, phased array antennas, etc. The antenna 1024 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC_Idle state, where it disconnects from the network and does not perform operations such as channel quality feedback, handover, etc. The UE 1000 goes into a very low power state, and it performs paging where again it periodically wakes up to listen to the network and then powers down again. The UE 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1028 may power the UE 1000, although in some examples the UE 1000 may be mounted deployed in a fixed location and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
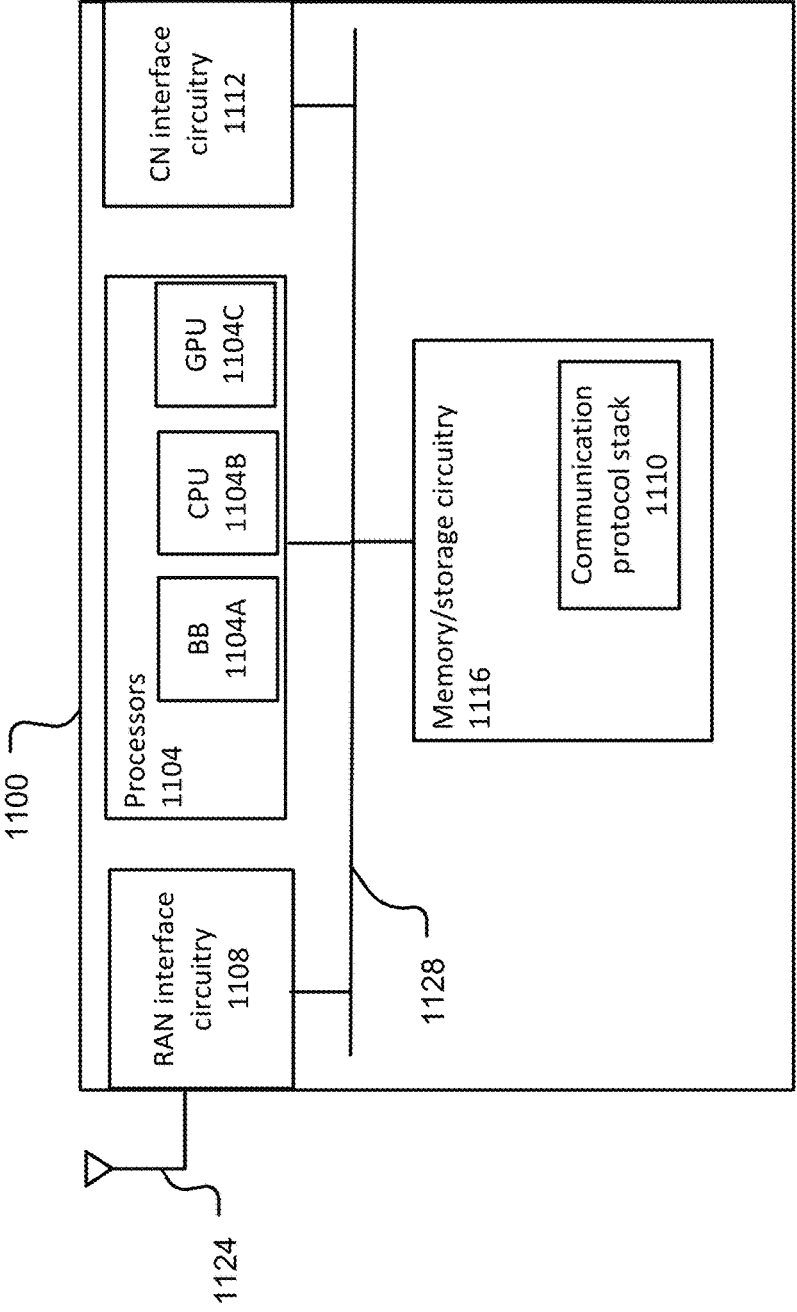
FIG. 11 illustrates an example of a base station, according to one or more embodiments.

FIG. 11 illustrates a gNB 1100, according to one or more embodiments. The gNB 1100 may include processors 1104, RF interface circuitry 1108, core network (CN) interface circuitry 1112, and memory/storage circuitry 1116.

The components of the gNB 1100 may be coupled with various other components over one or more interconnects 1128.

The processors 1104, RF interface circuitry 1108, memory/storage circuitry 1116 (including communication protocol stack 1110), antenna 1124, and interconnects 1128 may be similar to like-named elements shown and described with respect to FIG. 9.

The CN interface circuitry 1112 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided

Example 1 includes a method, comprising: selecting a first subscriber identity module (SIM) associated with a PLMN ID and a NID of a private network; generating a first NAS registration request to be transmitted to the private network to establish a connection with the private network using the first SIM; processing a NAS registration request reject message received from the private network; selecting a second SIM based the second SIM being associated with the PLMN ID and the NID; generating a second NAS registration request to be transmitted to the private network to establish a connection with the private network using the second SIM;

processing a NAS registration request success message received from the private network; and logging NID collision information based on the NAS registration request reject message, the NAS registration request success message, the first SIM being associated with the PLMN ID and NID, and the second SIM being associated with the PLMN ID and NID.

Example 2 includes the method of example 1, wherein the method further includes: generating a first RRC message including an indicator of an availability of NID collision information, wherein the first RRC message is to be transmitted to a base station; processing a request for the NID collision information received in a second RRC message from the base station; and generating a third RRC message with the NID collision information, the third RRC message to be transmitted to the base station.

Example 3 includes the method of any of example 1 and 2 wherein the NID collision information includes an indication that an NID collision has occurred, a time the NID collision occurred, or the PLMN ID and NID of the private network.

Example 4 includes the method of example 3, wherein the NID collision information further includes a GNSS location, a cell identifier, or a number of highest bits of the GNSS location.

Example 5 includes the method of any of examples 1-4, wherein the method further includes: determining expiration criteria has been fulfilled, the expiration criteria being a time-based expiration criteria or a location-based expiration criteria; and discarding the logged NID collision information based on determining the expiration criteria has been fulfilled.

Example 6 includes the method of example 5, wherein: the expiration criteria is a time-based expiration criteria that includes an expiration of a time interval; or the expiration criteria is a location-based expiration criteria that includes a change in location coordinates, a number of cell re-selections or handovers exceeding a threshold number, or moving out of a coverage of the private network.

Example 7 includes the method of any of examples 1-6, wherein the method further includes: connecting with a public network prior to the second NAS registration request being transmitted; and generating a message including an indicator of an availability of NID collision information, the message to be transmitted to the private network based on establishing a connection with the private network.

Example 8 includes the method of any of examples 1-7, wherein the NID collision information is a first NID collision information instance associated with a first NID collision, wherein a second NID collision information instance associated with a second NID collision is logged, wherein the second NID collision occurs after the first NID collision, and wherein the method further comprises discarding the first NID collision information instance.

Example 9 includes the method of any of examples 1-8, wherein the NID collision information is a first NID collision information instance associated with a first NID collision, wherein a plurality of NID collision information instances are logged, including the first NID collision information instance, and wherein logging NID collision information instances is discontinued upon reaching a threshold number of logged NID collision information instances.

Example 10 includes the method of any of examples 1-9, wherein the NAS registration request reject message includes cause code #11 or cause code #13, wherein NID collision information further includes a TAI, and wherein the NID collision information further includes a NCGI of a cell where the NAS registration request reject message was received.

Example 11 includes the method of any of examples 1-9, wherein the NID is self-selected by the private network, and wherein a cause code included in the NAS registration request reject message is selected based on the NID being self-selected.

Example 12 includes the method of any of examples 1-11, wherein the method further comprises:

generating a first message including an indicator of an availability of NID collision information, and wherein the first message is to be transmitted to an application server; processing a second message including an indicator of a request for the NID collision information, the second message received from the application server; and generating a third message including the NID collision information, the third message to be transmitted to the application server.

Example 13 includes an apparatus including memory having instructions and processing circuitry coupled with the memory to execute the instructions to perform any of the steps of examples 1-12.

Example 14 includes one or more non-transitory, computer-readable media, wherein the instructions, when executed, further cause an apparatus to perform any of the steps of examples 1-12.

Example 15 includes an apparatus comprising: memory having instructions; processing circuitry coupled with the memory to execute the instructions to: select a SIM associated with a PLMN ID and a NID of a first private network; generate a first non-access stratum (NAS) registration request to establish a connection with the first private network using the SIM, the first NAS registration request to be transmitted to a first private network; process a NAS registration request reject message received from the first private network; generate a second NAS registration request to establish a connection with a second private network using the SIM, the second private network associated with the PLMN ID and NID, and the second NAS registration request to be transmitted to the second private network; process a NAS registration request success message received from the second private network; and log NID collision information based on the NAS registration request reject message, the NAS registration request success message, and the first private network and the second private network being associated with the PLMN ID and NID.

Example 16 includes the apparatus of example 15, wherein the SIM is selected based on a SIB1 broadcast that includes the PLMN ID and the NID.

Example 17 includes the apparatus of any of examples 15 and 16, wherein the processing circuitry is to further execute the instructions to determine an expiration criteria has not been fulfilled.

Example 18 includes the apparatus of any of examples 15-17, wherein the first NAS registration request is generated while the apparatus transitions from a radio resource control (RRC) idle state to an RRC connected state, or while the apparatus transitions from an RRC inactive state to an RRC connected state.

Example 19 includes the apparatus of any of examples 15-18, wherein the apparatus is to be coupled with a single SIM or a single private SIM of a computing platform that incorporates the apparatus.

Example 20 includes a method for performing any of the steps of examples 15-19.

Example 21 includes one or more non-transitory, computer-readable media, wherein the instructions, when executed, further cause an apparatus to perform any of the steps of examples 15-19.

Example 22 includes one or more non-transitory, computer-readable media including instructions that, when executed, cause an apparatus to: process a first NAS registration request to establish a connection with a private network using a first SIM associated with a first PLMN ID and a NID; determine to reject the first NAS registration request based on the first SIM; process a second NAS registration request to establish a connection with the private network using a second SIM associated with the PLMN ID and a NID; and generate a NAS registration success message based on the second NAS registration request and the second SIM.

Example 23 includes the one or more non-transitory, computer-readable media of example 22, wherein the instructions, when executed, further cause the apparatus to determine to reject the first NAS registration request based on an AS security activation failure.

Example 24 includes the one or more non-transitory, computer-readable media of any of examples 22 and 23, wherein the first SIM is an eSIM.

Example 25 includes a method for performing any of the steps of examples 22-24.

Example 26 includes a computing system including memory having instructions and processing circuitry coupled with the memory to execute the instructions to perform any of the steps of examples 22-24.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

As described above, one aspect of the present technology is the gathering and use of data available from specific and legitimate sources to improve the delivery of messages from one device to one or more devices (e.g., delivering NID collision information) The present disclosure contemplates that in some instances, this gathered data may include personal information data that uniquely identifies or may be used to identify a specific person. Such personal information data may include demographic data, location-based data, online identifiers, telephone numbers, or any other personal information.

The present disclosure recognizes that the use of such personal information data, in the present technology, may be used to the benefit of users. For example, the personal information data may be used to deliver a command from a user profile on a computing device to one or more computing devices. Further, other uses for personal information data that benefit the user are also contemplated by the present disclosure. For instance, specific states of devices associated with the user may be transmitted from a device back to the user profile.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk may be minimized by limiting the collection of data and deleting data once it is no longer needed. In addition, and when applicable, data de-identification may be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments may also be implemented without the need for accessing such personal information data. That is, the various embodiments of the present technology are not rendered inoperable due to the lack of all or a portion of such personal information data. For example, content may be selected and delivered to users based on aggregated non-personal information data or a bare minimum amount of personal information, such as the content being handled only on the user's device or other non-personal information available to the content delivery services.

What is claimed is:

1. A method, comprising:

selecting a first subscriber identity module (SIM) associated with a public land mobile network identifier (PLMN ID) and a network identifier (NID) of a private network;

generating a first non-access stratum (NAS) registration request to be transmitted to the private network to establish a connection with the private network using the first SIM;

processing a NAS registration request reject message received from the private network;

selecting a second SIM based the second SIM being associated with the PLMN ID and the NID;

generating a second NAS registration request to be transmitted to the private network to establish a connection with the private network using the second SIM;

processing a NAS registration request success message received from the private network; and logging NID collision information based on the NAS registration request reject message, the NAS registration request success message, the first SIM being associated with the PLMN ID and NID, and the second SIM being associated with the PLMN ID and NID.

2. The method of claim 1, wherein the method further includes:

generating a first radio resource control (RRC) message including an indicator of an availability of NID collision information, wherein the first RRC message is to be transmitted to a base station;

processing a request for the NID collision information received in a second RRC message from the base station; and generating a third RRC message with the NID collision information, the third RRC message to be transmitted to the base station.

3. The method of claim 1 wherein the NID collision information includes an indication that an NID collision has occurred, a time the NID collision occurred, or the PLMN ID and NID of the private network.

4. The method of claim 3, wherein the NID collision information further includes a global navigation satellite system (GNSS) location, a cell identifier, or a number of highest bits of the GNSS location.

5. The method of claim 1, wherein the method further includes:

determining expiration criteria has been fulfilled, the expiration criteria being a time-based expiration criteria or a location-based expiration criteria; and discarding the logged NID collision information based on determining the expiration criteria has been fulfilled.

6. The method of claim 5, wherein:

the expiration criteria is a time-based expiration criteria that includes an expiration of a time interval; or the expiration criteria is a location-based expiration criteria that includes a change in location coordinates, a number of cell re-selections or handovers exceeding a threshold number, or moving out of a coverage of the private network.

7. The method of claim 1, wherein the method further includes:

connecting with a public network prior to the second NAS registration request being transmitted; and generating a message including an indicator of an availability of NID collision information, the message to be transmitted to the private network based on establishing a connection with the private network.

8. The method of claim 1, wherein the NID collision information is a first NID collision information instance associated with a first NID collision, wherein a second NID collision information instance associated with a second NID collision is logged, wherein the second NID collision occurs after the first NID collision, and wherein the method further comprises discarding the first NID collision information instance.

9. The method of claim 1, wherein the NID collision information is a first NID collision information instance associated with a first NID collision, wherein a plurality of NID collision information instances are logged, including the first NID collision information instance, and wherein logging NID collision information instances is discontinued upon reaching a threshold number of logged NID collision information instances.

10. The method of claim 1, wherein the NAS registration request reject message includes cause code #11 or cause code #13, wherein NID collision information further includes a tracking area identity (TAI), and wherein the NID collision information further includes a new radio cell global identifier (NCGI) of a cell where the NAS registration request reject message was received.

11. The method of claim 1, wherein the NID is self-selected by the private network, and wherein a cause code included in the NAS registration request reject message is selected based on the NID being self-selected.

12. The method of claim 1, wherein the method further comprises:

generating a first message including an indicator of an availability of NID collision information, and wherein the first message is to be transmitted to an application server;

processing a second message including an indicator of a request for the NID collision information, the second message received from the application server; and generating a third message including the NID collision information, the third message to be transmitted to the application server.

13. An apparatus comprising:

memory having instructions;

processing circuitry coupled with the memory to execute the instructions to:

select a subscriber identity module (SIM) associated with a public land mobile network identifier (PLMN ID) and a network identifier (NID) of a first private network;

generate a first non-access stratum (NAS) registration request to establish a connection with the first private network using the SIM, the first NAS registration request to be transmitted to the first private network;

process a NAS registration request reject message received from the first private network;

generate a second NAS registration request to establish a connection with a second private network using the SIM, the second private network associated with the PLMN ID and NID, and the second NAS registration request to be transmitted to the second private network;

process a NAS registration request success message received from the second private network; and log NID collision information based on the NAS registration request reject message, the NAS registration request success message, and the first private network and the second private network being associated with the PLMN ID and NID.

14. The apparatus of claim 13, wherein the SIM is selected based on a system information block one (SIB1) broadcast that includes the PLMN ID and the NID.

15. The apparatus of claim 13, wherein the processing circuitry is to further execute the instructions to determine an expiration criteria has not been fulfilled.

16. The apparatus of claim 13, wherein the first NAS registration request is generated while the apparatus transitions from a radio resource control (RRC) idle state to an RRC connected state, or while the apparatus transitions from an RRC inactive state to an RRC connected state.

17. The apparatus of claim 13, wherein the apparatus is to be coupled with a single SIM or a single private SIM of a computing platform that incorporates the apparatus.

18. One or more non-transitory, computer-readable media including instructions that, when executed, cause an apparatus to:

process a first non-access stratum (NAS) registration request to establish a connection with a private network using a first subscriber identity module (SIM) associated with a first public land mobile network identifier (PLMN ID) and a network identifier (NID);

determine to reject the first NAS registration request based on the first SIM;

process a second NAS registration request to establish a connection with the private network using a second SIM associated with the PLMN ID and the NID; and generate a NAS registration success message based on the second NAS registration request and the second SIM.

19. The one or more non-transitory, computer-readable media of claim 18, wherein the instructions, when executed, further cause the apparatus to determine to reject the first NAS registration request based on an access stratum (AS) security activation failure.

20. The one or more non-transitory, computer-readable media of claim 18, wherein the first SIM is an embedded SIM (eSIM).

\* \* \* \* \*

24